(12) United States Patent
Mizuno

(10) Patent No.: US 12,260,995 B2
(45) Date of Patent: Mar. 25, 2025

(54) CERAMIC ELECTRONIC DEVICE AND MANUFACTURING METHOD OF THE SAME

(71) Applicant: TAIYO YUDEN CO., LTD., Tokyo (JP)

(72) Inventor: Kotaro Mizuno, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 18/649,416

(22) Filed: Apr. 29, 2024

(65) Prior Publication Data
US 2024/0290545 A1    Aug. 29, 2024

Related U.S. Application Data

(63) Continuation of application No. 17/939,851, filed on Sep. 7, 2022, now Pat. No. 12,002,630.

(30) Foreign Application Priority Data

Sep. 30, 2021    (JP) .................................. 2021-161166

(51) Int. Cl.
*H01G 4/30*    (2006.01)
*C04B 35/468*    (2006.01)
(Continued)

(52) U.S. Cl.
CPC ........... *H01G 4/30* (2013.01); *C04B 35/4682* (2013.01); *C04B 35/64* (2013.01); *H01G 4/008* (2013.01); *H01G 4/012* (2013.01); *H01G 4/1227* (2013.01)

(58) Field of Classification Search
CPC ...... H01G 4/008; H01G 4/012; H01G 4/1227; H01G 4/30; C04B 35/4682
See application file for complete search history.

(56) References Cited

U.S. PATENT DOCUMENTS

2006/0043523 A1* 3/2006 Ito ........................... H01G 4/08
  257/510
2006/0208575 A1    9/2006 Orimo et al.
(Continued)

FOREIGN PATENT DOCUMENTS

JP    2014123698 A    7/2014

OTHER PUBLICATIONS

Notice of Allowance issued by U.S. Patent and Trademark Office, dated Mar. 6, 2024, for related U.S. Appl. No. 17/939,851 (14 pages).

*Primary Examiner* — Nathan Milakovich
(74) *Attorney, Agent, or Firm* — Law Office of Katsuhiro Arai

(57) ABSTRACT

A ceramic electronic device includes a multilayer chip in which dielectric layers and internal electrode layers each including Ni as a main phase are alternately stacked. At least one of the dielectric layers includes Si. One of the internal electrode layers next to the at least one of the dielectric layers includes a layer including an additive element including one or more of Au, Pt, Cu, Fe, Cr, Zn, and In. A peak of a concentration of the additive element and/or a peak of a concentration of Si in the one of the internal electrode layers and the at least one of the dielectric layers exist(s) in a region within 15 nm in a thickness direction from an interface between the one of the internal electrode layers and the at least one of the dielectric layers.

8 Claims, 11 Drawing Sheets

(51) Int. Cl.
    *C04B 35/64*     (2006.01)
    *H01G 4/008*     (2006.01)
    *H01G 4/012*     (2006.01)
    *H01G 4/12*     (2006.01)

(56) References Cited

U.S. PATENT DOCUMENTS

| | | | |
|---|---|---|---|
| 2009/0067117 | A1 | 3/2009 | Kasuya et al. |
| 2014/0048750 | A1 | 2/2014 | Kim et al. |
| 2014/0177133 | A1 | 6/2014 | Lee et al. |
| 2014/0376150 | A1 | 12/2014 | Kim et al. |
| 2019/0051460 | A1 | 2/2019 | Kawamura |
| 2019/0272954 | A1* | 9/2019 | Ariga .................... H01G 4/008 |
| 2020/0043653 | A1* | 2/2020 | Furusawa .............. H01G 4/008 |
| 2020/0066452 | A1* | 2/2020 | Cha ......................... H01G 4/30 |
| 2021/0202179 | A1 | 7/2021 | Saito et al. |
| 2022/0384109 | A1* | 12/2022 | Masuda ................. H01G 4/008 |
| 2023/0080684 | A1 | 3/2023 | Kim et al. |
| 2023/0084921 | A1* | 3/2023 | Masuda .............. C04B 35/4682 |
| | | | 361/301.4 |
| 2024/0112861 | A1* | 4/2024 | Mizuno ................ H01G 4/1209 |

* cited by examiner

CERAMIC ELECTRONIC DEVICE AND MANUFACTURING METHOD OF THE SAME

CROSS-REFERENCE TO RELATED APPLICATION

This application is a continuation of U.S. patent application Ser. No. 17/939,851, filed on Sep. 7, 2022, and claims the benefits thereof, which is the application based upon and claims the benefit of priority of the prior Japanese Patent Application No. 2021-161166, filed on Sep. 30, 2021, each disclosure of which is herein incorporated by reference in its entirety. The applicant herein explicitly rescinds and retracts any prior disclaimers or disavowals or any amendment/ statement otherwise limiting claim scope made in any parent, child or related prosecution history with regard to any subject matter supported by the present application.

FIELD

A certain aspect of the present invention relates to a ceramic electronic device and a manufacturing method of the ceramic electronic device.

BACKGROUND

Multilayer ceramic capacitors are made by printing a metal paste made from Ni powder acting as a main raw material on a dielectric green sheet made from a dielectric material such as barium titanate acting as a main raw material, and then stacking, crimping, cutting, removing a binder, firing and applying an external electrode, and so on. In order to reduce the size and enlarge capacity of the multilayer ceramic capacitors, which is a market requirement, thinning and high lamination of the internal electrode layer are required as well as thinning of the dielectric layer.

In order to suppress internal defects such as cracks in the simultaneous firing of a dielectric layer made of ceramics and an internal electrode layer made of a metal, in addition to the dielectric material that is the main phase in the dielectric layer, a secondary phase composed of a liquid phase component such as Si as a sintering agent is introduced to design a microstructure and electrical characteristics (see, for example, Japanese Patent Application Publication No. 2014-123698).

SUMMARY OF THE INVENTION

However, discontinuity is likely to occur at contact points of the internal electrode layer with the secondary phase due to the sintering promoting effect of the liquid phase sintering.

According to an aspect of the present invention, there is provided a ceramic electronic device including: a multilayer chip in which each of a plurality of dielectric layers and each of a plurality of internal electrode layers including Ni as a main phase are alternately stacked, wherein at least one of the plurality of dielectric layers includes a secondary phase including Si, at an interface between the at least one of the plurality of dielectric layers and one of the plurality of internal electrode layers next to the at least one of the plurality of dielectric layers, and wherein the one of the plurality of internal electrode layers includes a layer including an additive element including one or more of Au, Pt, Cu, Fe, Cr, Zn, and In, at a region contacting the secondary phase at the interface.

According to another aspect of the present invention, there is provided a manufacturing method of a ceramic electronic device including: forming a plurality of stack units by forming each of internal electrode patterns of a Ni paste on each of dielectric green sheets including sintering agent including $SiO_2$, the Ni paste including an additive of one or more of Au, Pt, Cu, Fe, Cr, Zn and In; forming a multilayer structure by stacking the plurality of stack units; and firing the multilayer structure, wherein a condition of the firing is adjusted so that at least one of dielectric layers formed from the dielectric green sheets includes a secondary phase including Si, at an interface between the at least one of dielectric layers and one of internal electrode layers formed from the internal electrode patterns next to the at least one of the dielectric layers, and a layer including the additive element is formed at a region of the one of internal electrode layers contacting the secondary phase.

DETAILED DESCRIPTION

A description will be given of an embodiment with reference to the accompanying drawings.

Figure 1:
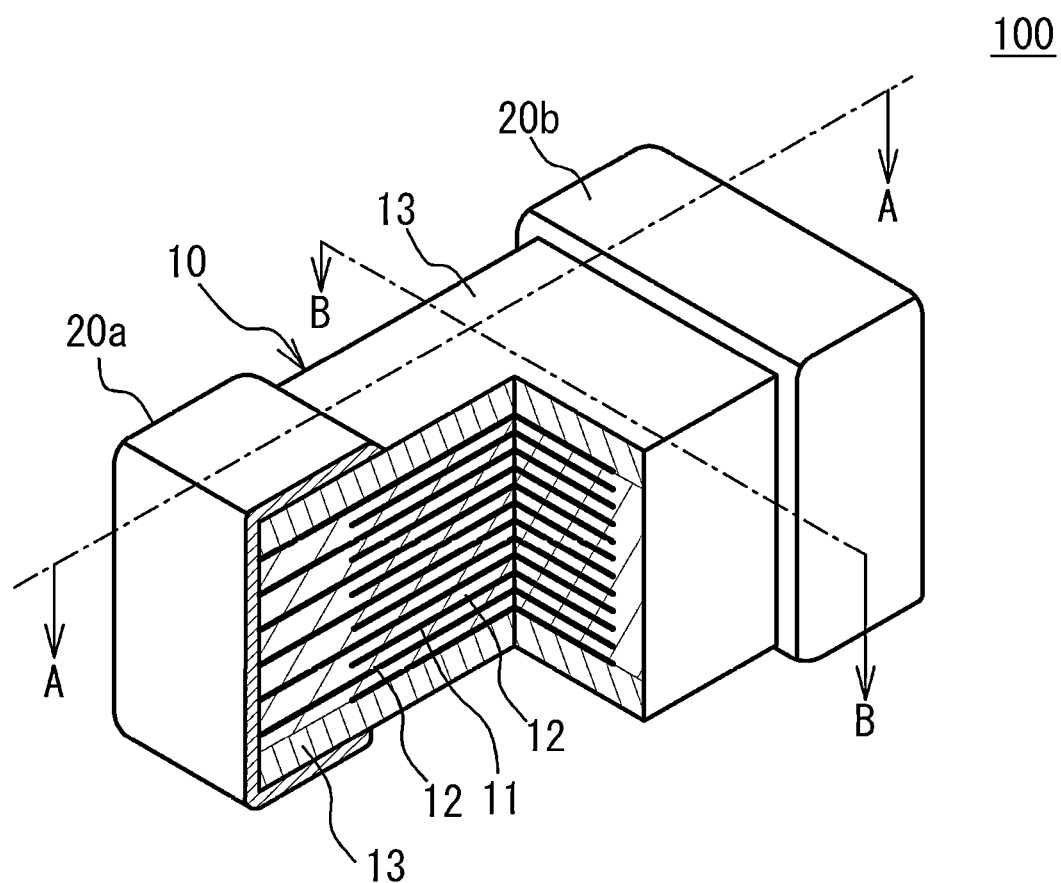
FIG. 1 illustrates a perspective view of a multilayer ceramic capacitor in which a cross section of a part of the multilayer ceramic capacitor is illustrated.
Figure 2:
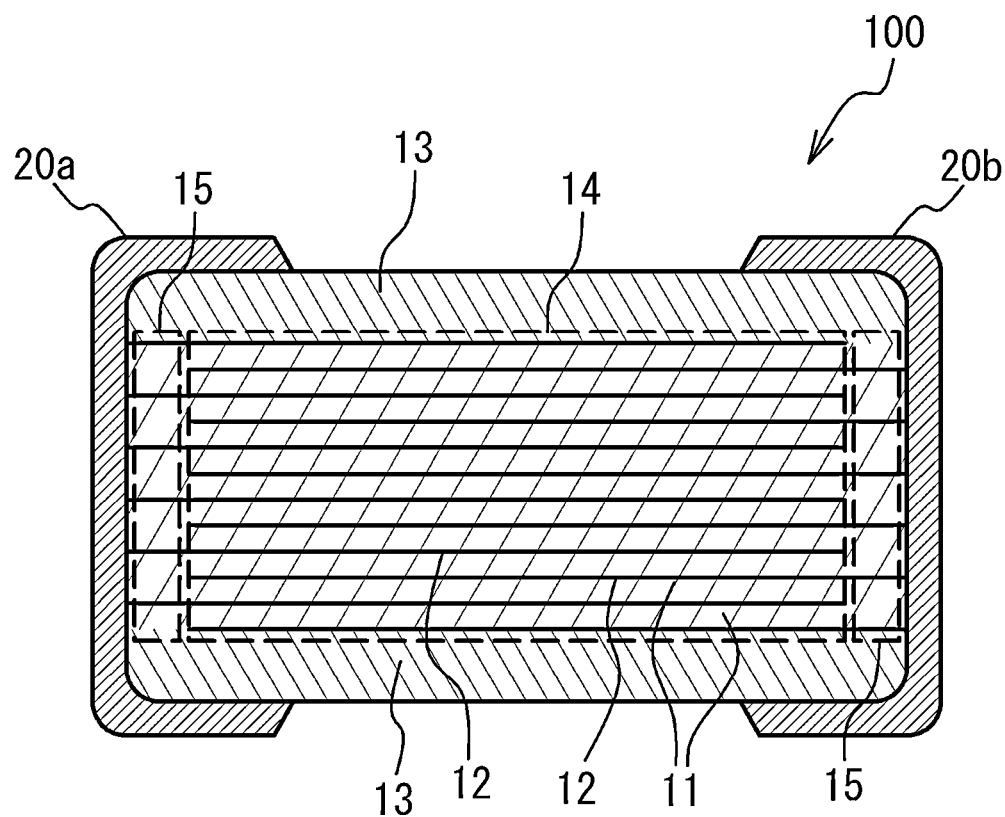
FIG. 2 illustrates a cross sectional view taken along a line A-A of FIG. 1.
Figure 3:
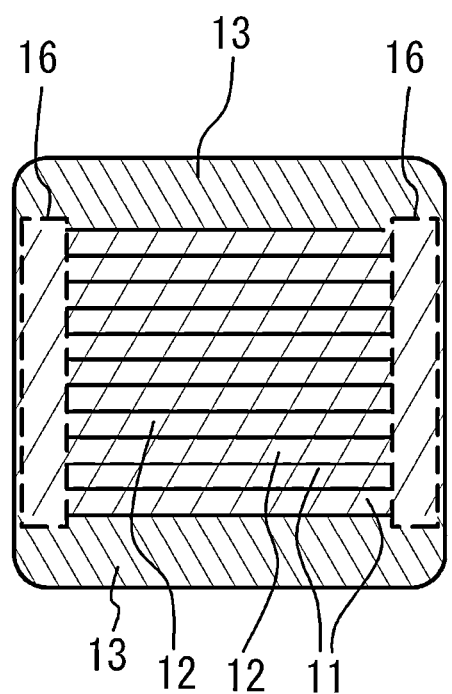
FIG. 3 illustrates a cross sectional view taken along a line B-B of FIG. 1.

(First Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

The multilayer structure of the dielectric layers 11 and the internal electrode layers 12 can be obtained by firing a plurality of stack units in which a metal paste containing Ni powder as a main raw material is printed on a dielectric green sheet. Therefore, the dielectric layer 11 of a ceramic and the internal electrode layer 12 of a metal are co-fired. In order to suppress internal defects such as cracks that are likely to occur in the co-firing process, a sintering agent containing Si is added to the dielectric green sheet. The sintering agent becomes a liquid phase at the time of firing, causes liquid phase sintering, and promotes sintering of the main component ceramic of the dielectric layer 11. This liquid phase becomes a secondary phase after firing.

Figure 4:
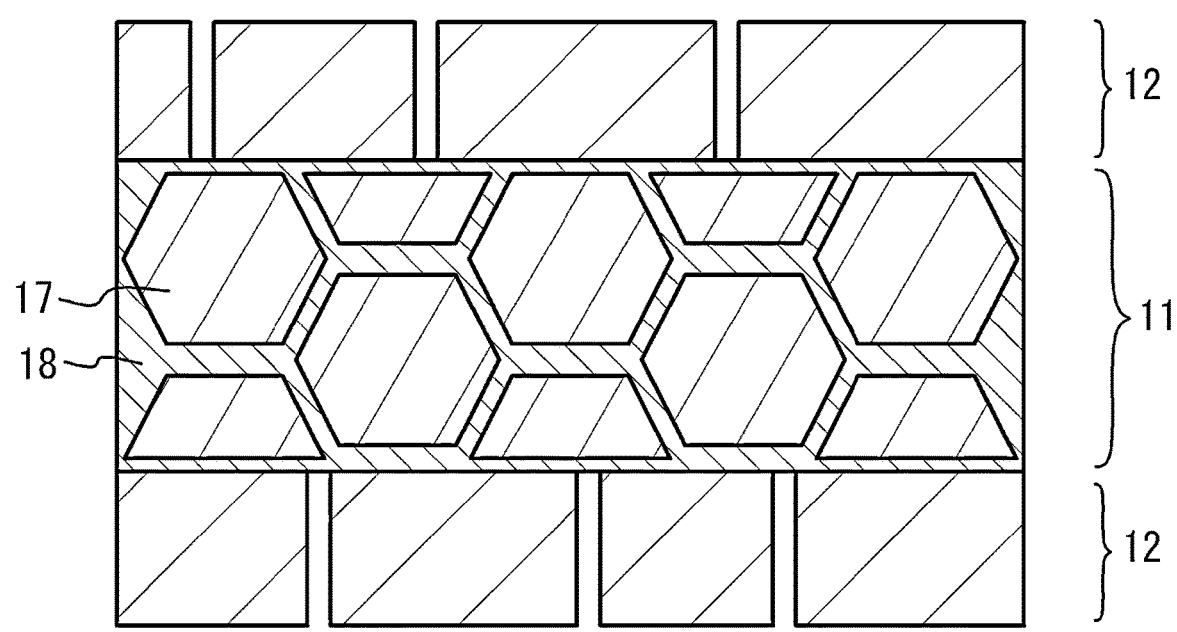
FIG. 4 is a diagram illustrating main phases and secondary phases formed in a dielectric layer.

FIG. 4 is a diagram illustrating main phases 17 and secondary phases 18 formed in the dielectric layer 11. As illustrated in FIG. 4, the dielectric layer 11 is formed with the main phases 17 and the secondary phases 18. The main phase 17 is a grain of the main component ceramic of the dielectric layer 11. The secondary phase 18 is formed at the grain boundaries of the main phases 17 and at the interface between the dielectric layer 11 and the internal electrode layer 12. The secondary phase 18 is a phase generated in the dielectric layer 11 by firing the sintering agent, and has, for example, $SiO_2$ or at least one of $SiO_2$ and $B_2O_3$ as a main component. At the portion of the internal electrode layer 12 that comes into contact with the secondary phase 18, discontinuity is likely to occur due to the sintering promoting effect of the liquid phase sintering, which may cause a decrease in the continuity modulus.

Figure 5:
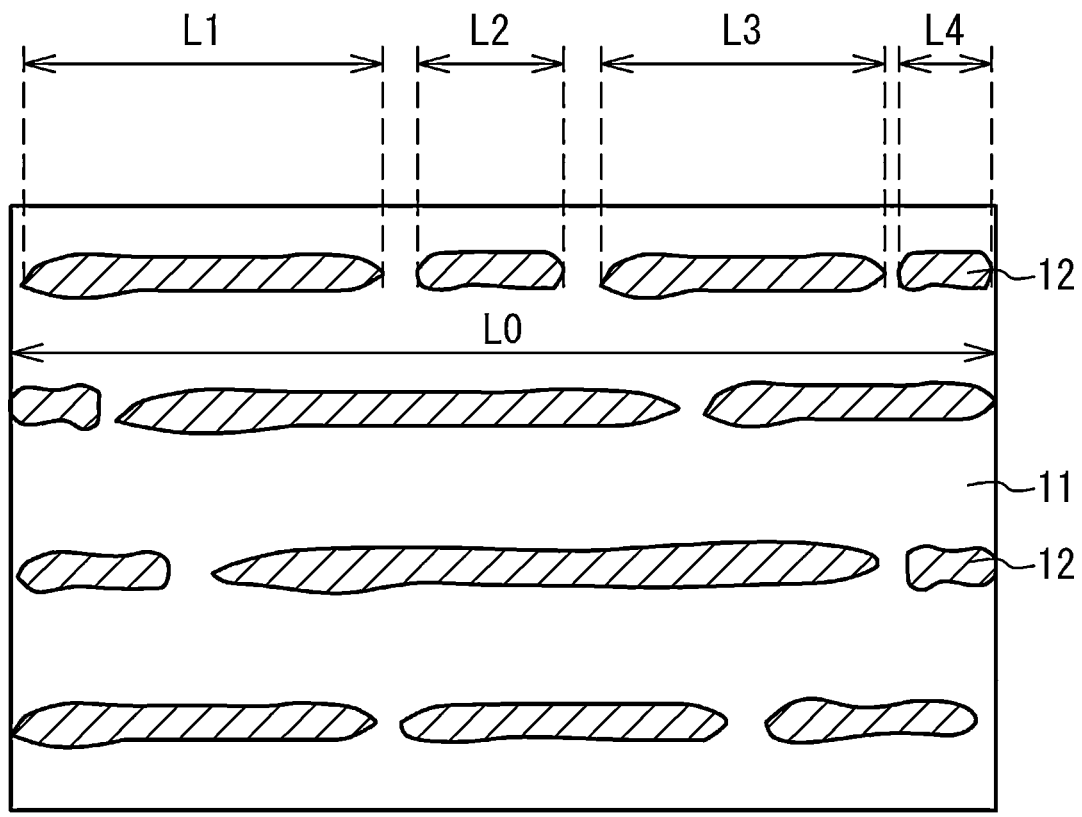
FIG. 5 illustrates a continuity modulus.

FIG. 5 is a diagram illustrating the continuity modulus. As illustrated in FIG. 5, in the observation region of a length L0 in the internal electrode layer 12, the lengths L1, L2, ..., Ln of the metal portions are measured and totaled, and the ratio of the metal portions which is $\Sigma Ln/L0$ can be defined as the continuity modulus of the layer.

Figure 6:
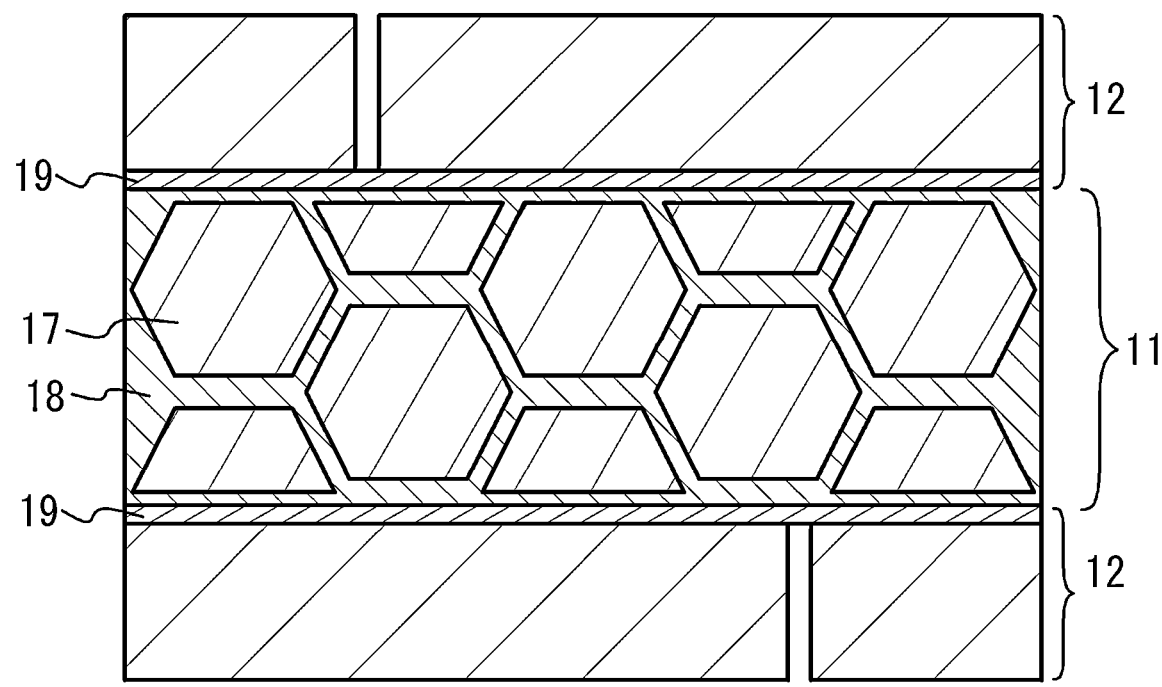
FIG. 6 illustrates a layer including an additive element.

The multilayer ceramic capacitor 100 according to the present embodiment has a structure that suppresses a decrease in the continuity modulus of the internal electrode layer 12. First, as illustrated in FIG. 6, at least one of the dielectric layers 11 includes the secondary phase 18 at the interface between the dielectric layer 11 and the internal electrode layer 12.

The internal electrode layer 12 has a layer 19 including an additive element of one or more of Au, Pt, Cu, Fe, Cr, Zn and In at the portion of the internal electrode layer 12 contacting the secondary phase 18 at the interface between the dielectric layer 11 and the internal electrode layer 12. The layer 19 is a thin layer that appears on the surface layer of the internal electrode layer 12, and is a layer in which a peak appears in the concentration of the additive element when the STEM-EDS line analysis is performed along the stacking direction.

The layer 19 may be a single metal, an alloy, or an oxide of one or more additive elements of Au, Pt, Cu, Fe, Cr, Zn and In. Since the layer 19 causes pinning at the interface, the effect of promoting sintering at the contact interface with the secondary phase 18 existing as the liquid phase at the time of firing is suppressed, and spheroidizing and discontinuity of the internal electrode layer 12 is suppressed, and the decrease in the continuity modulus of the internal electrode layer 12 is suppressed. The layer 19 may cover the entire interface between the dielectric layer 11 and the internal electrode layer 12, or may cover at least a part of the interface.

For example, since Au, Pt and Cu have higher ionization energies than Ni, the layer 19 containing at least one of Au, Pt and Cu suppresses atomic diffusion associated with sintering and also suppresses the effect of promoting sintering at the contact interface with the secondary phase 18. Since Fe, Cr, Zn and In form an oxide or composite oxide that is more stable than an oxide or composite oxide of Ni, the layer 19 containing at least one of Fe, Cr, Zn and In suppresses the reaction of dissolving metallic Ni into the secondary phase 18 and suppresses the effect of promoting sintering.

When the total amount of Au, Pt, Cu, Fe, Cr, Zn and In in the internal electrode layer 12 is small, the sintering promoting effect may not be necessarily sufficiently suppressed at the contact interface with the secondary phase 18. Therefore, in the internal electrode layer 12, it is preferable to set a lower limit for the total amount of Au, Pt, Cu, Fe, Cr, Zn and In. For example, in the internal electrode layer 12, the total amount of Au, Pt, Cu, Fe, Cr, Zn and In is preferably 0.01 at % or more, preferably 0.05 at % or more and more preferably 0.1 at % or more, when Ni is 100 at %. Of Au, Pt, Cu, Fe, Cr, Zn and In, the unadded metal is not added to the total amount. Therefore, when only Au is added to the internal electrode layer 12, the total amount of Au, Pt, Cu, Fe, Cr, Zn and In is the amount of Au.

On the other hand, when the total amount of Au, Pt, Cu, Fe, Cr, Zn and In is large in the internal electrode layer 12, there is a possibility of non-negligible problems such as possibility that problems such as diffusion of these elements into the dielectric layer 11, oxidation of the internal electrode layer 12, and influence of sintering of the internal electrode layer 12. Therefore, in the internal electrode layer 12, it is preferable to set an upper limit on the total amount of Au, Pt, Cu, Fe, Cr, Zn and In. For example, in the internal electrode layer 12, the total amount of Au, Pt, Cu, Fe, Cr, Zn and In is preferably 5 at % or less, preferably 3 at % or less, more preferable 1 at % or less when Ni is 100 at %.

The thickness of the dielectric layer 11 per layer is 0.05 μm or more and 5 μm or less, or 0.1 μm or more and 3 μm or less, or 0.2 μm or more and 1 μm or less, or 0.6 μm or less. Here, when the dielectric layer 11 is thin, the binding force of the dielectric layer 11 at the time of sintering decreases, so that spheroidization tends to occur in the internal electrode layer 12. Therefore, in a configuration in which the dielectric layer 11 is thin, the effect of suppressing a decrease in the continuity modulus of the internal electrode layer 12 of the present embodiment can be remarkably obtained. For example, when the dielectric layer 11 is 0.5 μm or less, the effect of the present embodiment can be remarkably obtained. The thickness of the dielectric layer 11 is determined by observing the cross section of the multilayer ceramic capacitor 100 with an SEM (scanning electron microscope) and measuring the thickness of each of 10 different layers of the dielectric layer 11 by 10 points, and calculating the average value of all measurement points.

In a configuration in which the internal electrode layer 12 is thin, the effect of suppressing a decrease in the continuity modulus of the internal electrode layer 12 of the present embodiment can be remarkably obtained. For example, when the thickness of the internal electrode layer 12 per layer is 0.4 μm or less, 0.6 μm or less, or 0.8 μm or less, the effect of the present embodiment is remarkably obtained. On the other hand, when the internal electrode layer 12 is too thin, the thickness ratio of the layer 19 may become high with respect to the thickness of the internal electrode layer 12, the ESR (equivalent series resistance) may increase, the internal electrode layer 12 may be oxidized, and the internal electrode layer 12 becomes thick. The effect of sinterability may not be necessarily negligible. Therefore, the thickness of the internal electrode layer 12 per layer is preferably 0.05 μm or more, more preferably 0.1 μm or more, and further preferably 0.15 μm or more. As for the thickness of the internal electrode layer 12, the cross section of the multilayer ceramic capacitor 100 is observed by SEM, the thickness of each of the 10 different internal electrode layers 12 is measured by 10 points, and the average value of all the measurement points is calculated.

When the thickness ratio (thickness of the secondary phase 18/thickness of the layer 19) in the stacking direction between the dielectric layer 11 and the internal electrode layer 12 is large, the amount of the liquid phase in the system increases relatively, and the interface Thus, it may be difficult to maintain the action of pinning at the interface. Therefore, it is preferable to set an upper limit on the thickness ratio. For example, the thickness ratio is preferably 3 or less, more preferably 2 or less, and even more preferably 1.5 or less. On the other hand, when the thickness ratio is small, the dielectric layer cannot absorb the shrinkage stress associated with the sintering of the internal electrode layer that occurs at a lower temperature, and cracks may occur. Therefore, it is preferable to set a lower limit for the thickness ratio. For example, the thickness ratio is preferably 0.1 or more, more preferably 0.3 or more, and even more preferably 0.5 or more.

Figure 7:
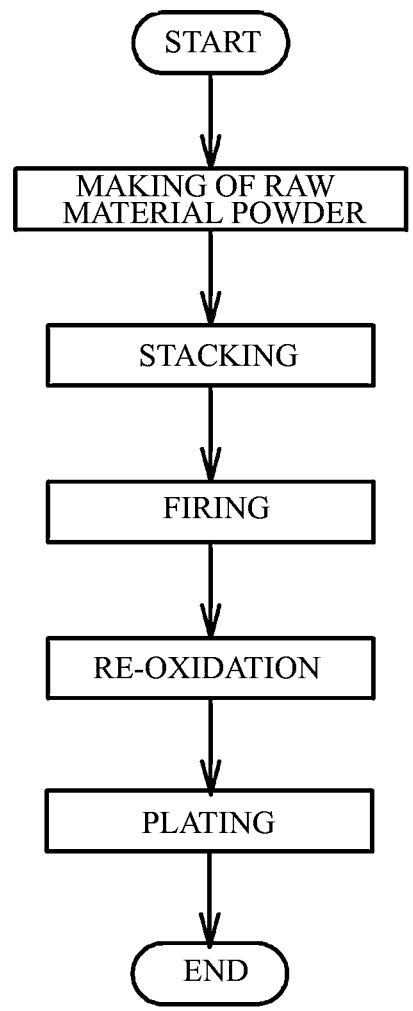
FIG. 7 illustrates a manufacturing method of a multilayer ceramic capacitor.

Next, a description will be given of a manufacturing method of the multilayer ceramic capacitors 100. FIG. 7 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of Mg (magneseium), Mn (manganese), V (vanadium), Cr or a rare earth element (Y, Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si (silicon). The additive compound may be a glass including cobalt, nickel, lithium, boron, sodium, potassium or silicon. Among them, $SiO_2$ mainly acts as a sintering agent.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 8A:
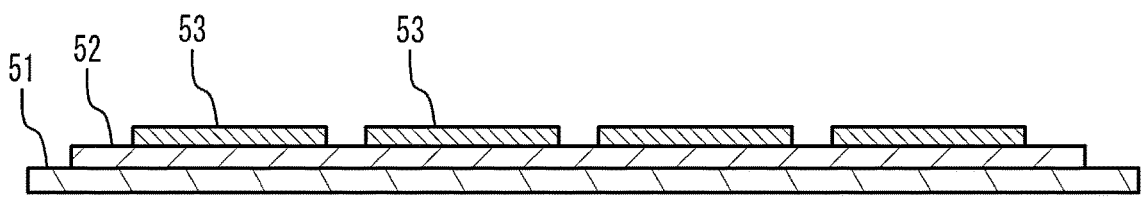
FIG. 8A and FIG. 8B illustrate a stacking process.

Next, as illustrated in FIG. 8A, an internal electrode pattern 53 is formed on the dielectric green sheet 52. In FIG. 8A, as an example, four parts of the internal electrode pattern 53 are formed on the dielectric green sheet 52 and are spaced from each other. The dielectric green sheet 52 on which the internal electrode pattern 53 is formed is a stack unit.

Ni paste is used for the internal electrode pattern 53. The Ni paste contains Ni powder, and an organic metal complex or fine powder of at least one additive element of Au, Pt, Cu, Fe, Cr, Zn, and In. An alloy powder of an additive element and Ni may be used. Ni powder coated on the surface of the additive element may be used. The effective metal concentration of the added element is preferably 0.01 at % or more and 5 at % or less when Ni is 100 at %. Further, the film forming method may be printing, sputtering, vapor deposition, plating or the like.

Figure 8B:
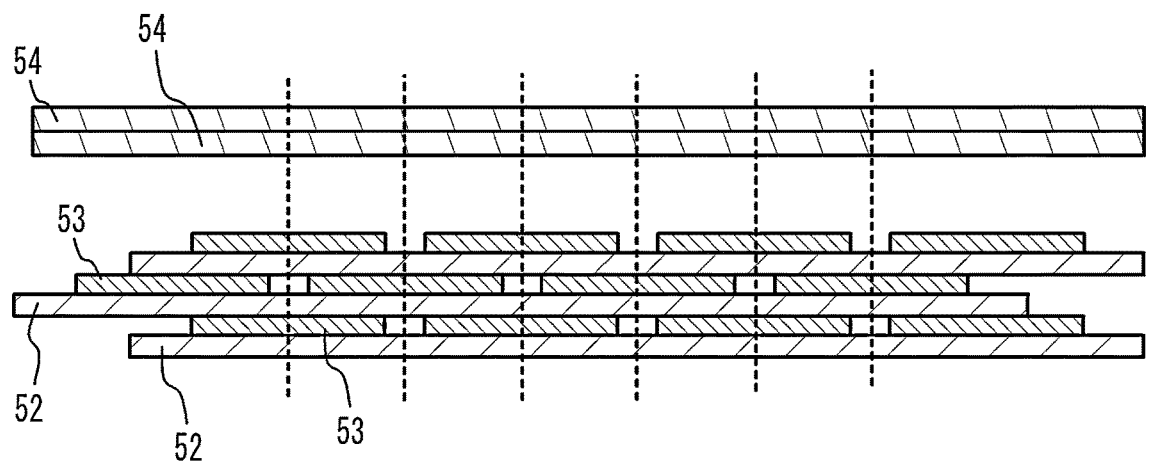

Next, the dielectric green sheets 52 are peeled from the base materials 51. As illustrated in FIG. 8, the stack units are stacked.

A predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 8, the multilayer structure is cut along a dotted line. The components of the cover sheet 54 may be the same as those of the dielectric green sheet 52. Additives of the cover sheet 54 may be different from those of the dielectric green sheet 52.

(Firing process) The binder is removed from the ceramic multilayer structure in $N_2$ atmosphere. A metal paste to be the base layer of the external electrodes 20a and 20b is applied to the both end faces of the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C.

The layer 19 can be formed by adjusting the firing conditions such as the firing temperature, the rate of temperature rise to the firing temperature, and the atmosphere during the firing process. It is important to form the layer 19 on the surface layer of the internal electrode layer 12 before the liquid phase component containing $SiO_2$ as a sintering aid comes into contact with the internal electrode material containing Ni as the main component and the sintering promoting effect is achieved. Therefore, in the lower temperature range (for example, the temperature range of 1000° C. or lower) than the temperature range where the $SiO_2$ serving as the sintering aid melts and the liquid phase begins to form, the temperature rise rate range of 50° C./min or less is set for 3 minutes or a firing profile is provided with a temperature keeping period of 1 minute or more (retention period at the same temperature).

(Re-oxidizing process) After that, a re-oxidizing process may be performed in $N_2$ gas atmosphere in a temperature range of 600 degrees C. to 1000 degrees C.

(Plating process) After that, by a plating process, plated layers of Cu, Ni, Sn or the like may be formed on the external electrodes 20a and 20b.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Example 1) A chip shape having a size of 1.0 mm×0.5 mm×0.5 mm was obtained by stacking, crimping, cutting, removing binder, and firing stacked stack units in which a Ni paste containing Ni powder was printed on a dielectric green sheet containing barium titanate as a dielectric material. The thickness of the dielectric layer was 0.8 μm. The thickness of the internal electrode layer was 0.6 μm. Each number of layers of the dielectric layers and the internal electrode layers was 470. In addition to the dielectric material which was the main phase, an appropriate amount of $SiO_2$ powder was blended in the dielectric as a sintering aid. An Au source was added to the Ni paste. When Ni was 100 at %, the amount of Au was 1 at %.

(Example 2) In an example 2, the conditions were the same as in the example 1 except that the thickness of the internal electrode layer was 0.5 μm.

(Example 3) In an example 3, the conditions were the same as in the example 1 except that the thickness of the internal electrode layer was 0.4 μm.

(Example 4) In an example 4, a Pt source was added to the Ni paste instead of the Au source. When Ni was 100 at %, the amount of Pt was 1 at %. The thickness of the internal electrode layer was set to 0.4 μm. Others were the same as in the example 1.

(Example 5) In an example 5, a Cu source was added to the Ni paste instead of the Au source. When Ni was 100 at %, the amount of Cu was 1 at %. The thickness of the internal electrode layer was set to 0.4 μm. Others were the same as in the example 1.

(Example 6) In an example 6, an Fe source was added to the Ni paste instead of the Au source. When Ni was 100 at %, the Fe amount was 1 at %. The thickness of the internal electrode layer was set to 0.4 μm. Others were the same as in the example 1.

(Example 7) In an example 7, a Cr source was added to the Ni paste instead of the Au source. When Ni was 100 at %, the amount of Cr was 1 at %. The thickness of the internal electrode layer was set to 0.4 μm. Others were the same as in the example 1.

(Example 8) In an example 8, a Zn source was added to the Ni paste instead of the Au source. When Ni was 100 at %, the amount of Zn was 1 at %. The thickness of the internal electrode layer was set to 0.4 μm. Others were the same as in the example 1.

(Example 9) In an example 9, an In source was added to the Ni paste instead of the Au source. When Ni was 100 at %, the amount of In was 1 at %. The thickness of the internal electrode layer was set to 0.4 μm. Others were the same as in the example 1.

(Comparative Example 1) In a comparative example 1, the Au source was not added to the Ni paste. Others were the same as in the example 1.

(Comparative Example 2) In a comparative example 2, the Au source was not added to the Ni paste. The thickness of the internal electrode layer was set to 0.5 μm. Others were the same as in the example 1.

(Comparative Example 3) In a comparative example 3, the Au source was not added to the Ni paste. The thickness of the internal electrode layer was set to 0.4 μm. Others were the same as in the example 1.

For each of the examples 1 to 9 and the comparative examples 1 to 3, STEM-EDS line analysis was performed at the interface between the dielectric layer and the internal electrode layer. In the examples 1 to 9, a layer containing an additive element was confirmed on the internal electrode layer side. And it was confirmed that the layer was in contact with the secondary phase on the dielectric layer side.

Figure 9:
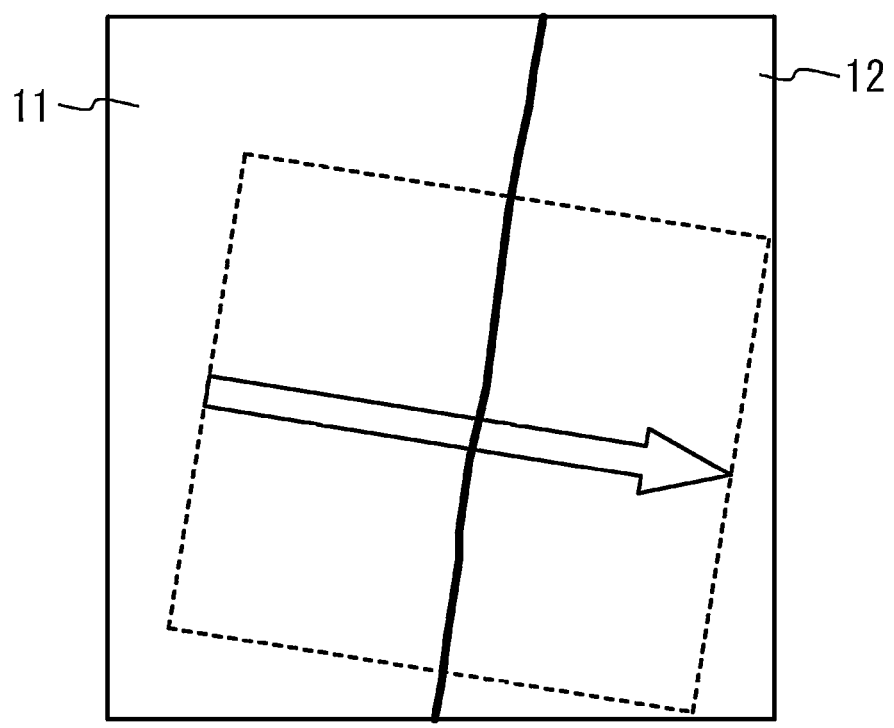
FIG. 9 is a diagram illustrating positions where STEM-EDS line analysis is performed.

FIG. 9 is a diagram illustrating positions where STEM-EDS line analysis was performed on the multilayer ceramic capacitor of the example 1. As illustrated in FIG. 9, line analysis was performed from the dielectric layer toward the internal electrode layer near the interface between the dielectric layer and the internal electrode layer, where the secondary phase and the layer containing the additive element came into contact with each other.

Figure 10A:
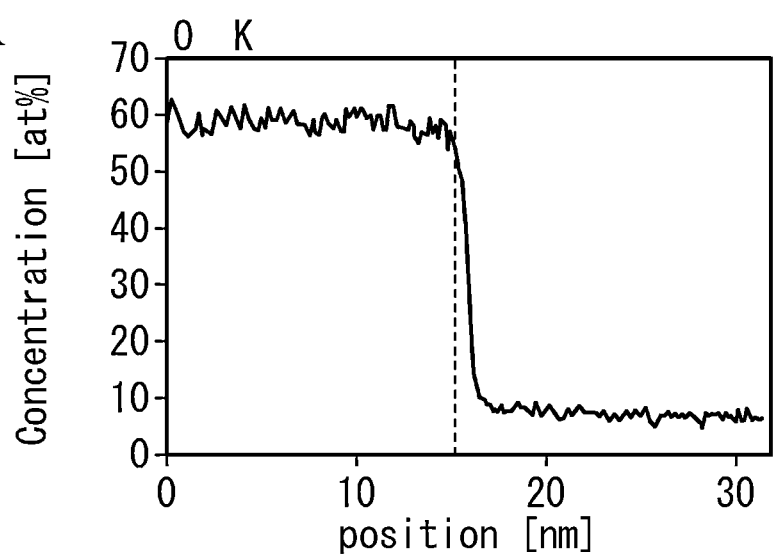
FIG. 10A to FIG. 10C illustrate results of STEM-EDS line analysis of a multilayer ceramic capacitor of an example 1.
Figure 10B:
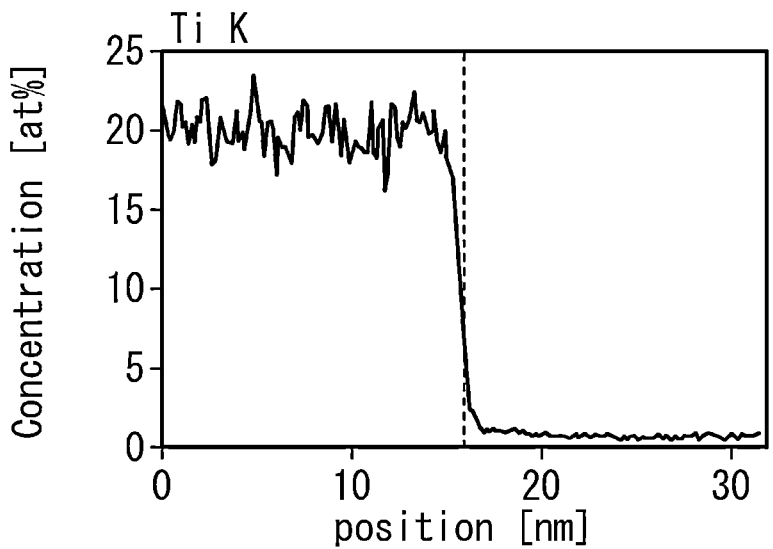
Figure 10C:
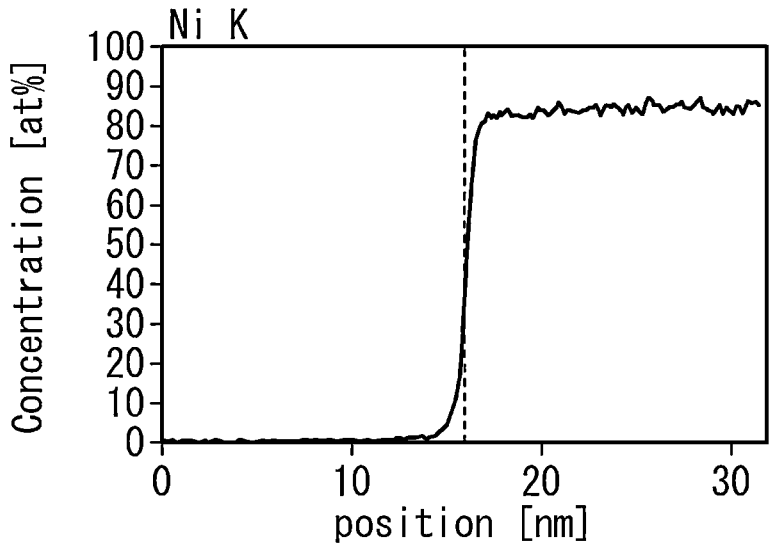
Figure 11A:
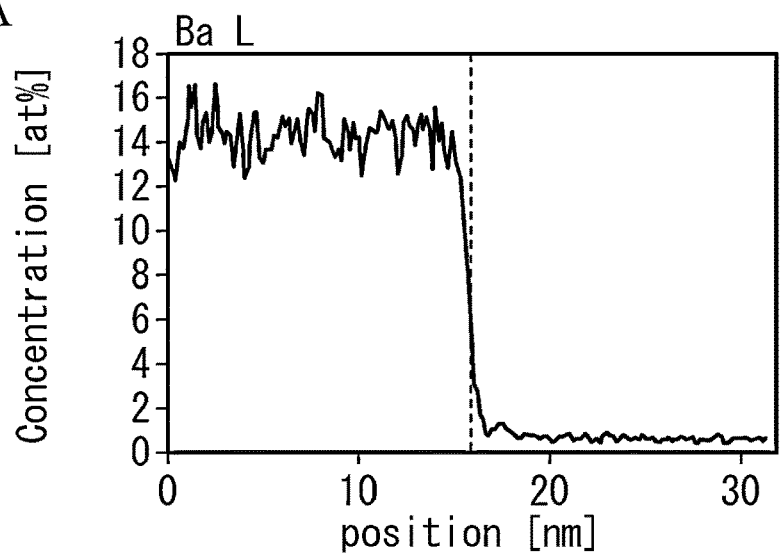
FIG. 11A to FIG. 11C illustrate results of STEM-EDS line analysis of a multilayer ceramic capacitor of an example 1.
Figure 11B:
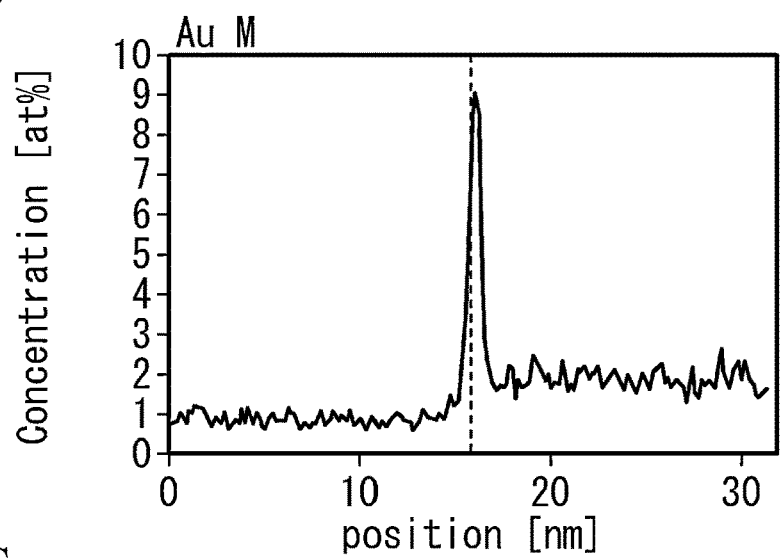
Figure 11C:
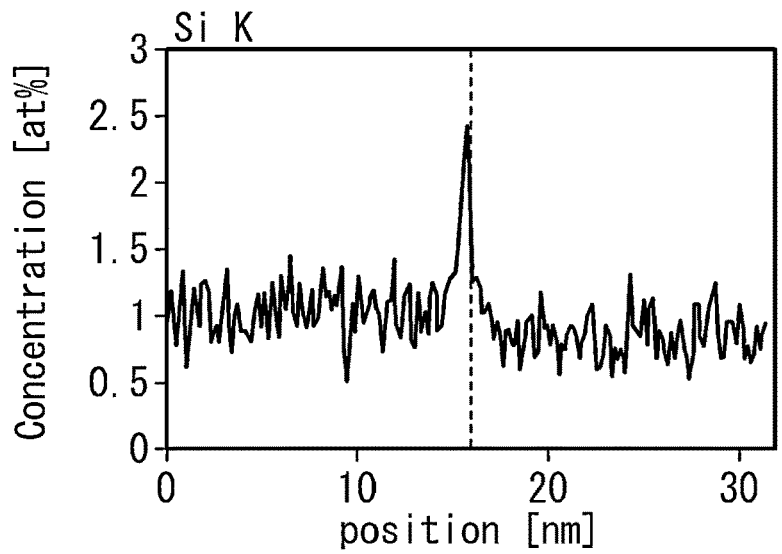

FIG. 10A to FIG. 11C illustrate the results of STEM-EDS line analysis of the multilayer ceramic capacitor of the example 1. FIG. 10A illustrates the measured concentration of O (oxygen). FIG. 10B illustrates the measured concentration of Ti. FIG. 10C illustrates the measured concentration of Ni. FIG. 11A illustrates the measured concentration of Ba. FIG. 11B illustrates the measured concentration of Au. FIG. 11C illustrates the measured concentration of Si. In FIG. 10A to FIG. 11C, the dotted line represents the interface between the dielectric layer 11 and the internal electrode layer 12.

As illustrated in FIG. 10A, the O (oxygen) concentration drops sharply at the interface. It is considered that this was because the oxygen concentration was low in the internal electrode layer. As illustrated in FIG. 10B, the Ti concentration sharply decreases at the interface. It is considered that this was because Ti was mainly contained in barium titanate in the dielectric layer and the Ti concentration was low in the internal electrode layer. As illustrated in FIG. 10C, the Ni concentration sharply increases at the interface. It is considered that this was because Ni was mainly contained in the internal electrode layer and the Ni concentration was low in the dielectric layer. As illustrated in FIG. 11A, the Ba concentration sharply decreases at the interface. It is considered that this was because Ba was mainly contained in barium titanate in the dielectric layer and the Ba concentration was low in the internal electrode layer.

As illustrated in FIG. 11B and FIG. 11C, a peak of Au concentration and a peak of Si concentration appeared near the interface. The peak of Au concentration was located on the side of the internal electrode layer from the interface. It is considered that this was because a layer containing Au was formed on the inner electrode layer side at the interface. The peak of Si concentration was located on the dielectric layer side from the interface. It is considered that this was because the secondary phase was formed on the dielectric layer side at the interface. The amount of Si at the Au peak top position was higher than the average level of Si in the dielectric layer. Further, the Au amount at the Si peak top position was higher than the average level of Au amount in the internal electrode layer. The Si ratio (at %) in the secondary phase in contact with the layer containing Au was 1 at % or more higher than the average value (at %) of the amount of Si in the dielectric layer.

In the examples 2 to 9, as in the example 1, a peak of the additive element concentration and a peak of the Si concentration appeared near the interface. The peak of the additive element concentration was located on the side of the internal electrode layer from the interface. It is considered that this was because a layer containing an additive element was formed on the inner electrode layer side at the interface. The peak of Si concentration was located on the side of the dielectric layer from the interface. It is considered that this was because the secondary phase was formed on the side of the dielectric layer side at the interface. The amount of Si at the top of the peak of the additive element was higher than the average level of Si in the dielectric layer. Further, the amount of additive element at the Si peak top position was higher than the average level of additive element in the internal electrode layer. In each example, as illustrated in FIG. 11B, the layer containing the additive element had the highest concentration of the additive element within the range of 15 nm on the internal electrode layer side and the dielectric layer side, respectively, with the interface as a reference. The region where the concentration of the additive element was the highest was the region indicating the position of the peak of the additive element. Further, in each embodiment, as illustrated in FIG. 11C, the secondary phase containing Si had the highest concentration of Si in the range of 15 nm on the internal electrode layer side and the dielectric layer side, respectively, with the interface as a reference. The region where the concentration of Si was the highest was the region indicating the position of the peak of Si.

In the comparative examples 1 to 3, no layer containing an additive element was confirmed.

For each of the examples 1 to 9, the thickness of the secondary phase/the thickness of (the layer containing the additive element) in the stacking direction was measured at the interface between the dielectric layer and the internal electrode layer. The ratio was 0.73 in the example 1, 0.96 in the example 2, 1.10 in the example 3, 1.04 in the example 4, 1.09 in the example 5, 1.14 in the example 6, 1.12 in the example 7, 0.99 in the example 8, and 0.93 in the example 9.

The continuity modulus of the internal electrode layer was measured for each of the multilayer ceramic capacitors of the examples 1 to 9 and the comparative examples 1 to 3. The continuity modulus of the internal electrode layer was measured by SEM observation (magnification 5000 times, 4-field average) of the cross-section polished surface near the center of the chip. The continuity modulus ratio between the same thicknesses was measured in the examples and the comparative examples. The results are shown in Table 1. Compared with the continuity modulus of the comparative example 1, the continuity modulus of the example 1 was 1.05 times. Compared with the continuity modulus of the comparative example 2, the continuity modulus of the example 2 was 1.14 times. Compared with the continuity modulus of the comparative example 3, the continuity modulus of the example 3 was 1.17 times, the continuity modulus of the example 4 was 1.26 times, the continuity modulus of the example 5 was 1.16 times, the continuity modulus of the example 6 is 1.17 times, the continuity modulus of the example 7 was 1.26 times, the continuity modulus of the example 8 was 1.17 times, and the continuity modulus of the example 9 was 1.17 times. From the above results, it was found that, under the condition that the thickness of the internal electrode layer was the same, the continuity modulus of the internal electrode layer was improved by bringing the layer containing the additive element into contact with the secondary phase.

TABLE 1

| | THICKNESS OF INTERNAL ELECTRODE LAYER | ADDITIVE ELEMENT | CONCENTRATION OF ADDITIVE ELEMENT | SEGREGATION LAYER | RATIO OF THICKNESS | RATIO OF CONTINUITY MODULUS |
|---|---|---|---|---|---|---|
| EXAMPLE 1 | 0.6 μm | Au | 1 at % | EXIST | 0.73 | 1.05 |
| COMPARATIVE EXAMPLE 1 | | — | — | NONE | — | 1 |
| EXAMPLE 2 | 0.5 μm | Au | 1 at % | EXIST | 0.96 | 1.14 |
| COMPARATIVE EXAMPLE 2 | | — | — | NONE | — | 1 |
| EXAMPLE 3 | 0.4 μm | Au | 1 at % | EXIST | 1.10 | 1.17 |
| EXAMPLE 4 | | Pt | 1 at % | EXIST | 1.04 | 1.26 |
| EXAMPLE 5 | | Cu | 1 at % | EXIST | 1.09 | 1.16 |
| EXAMPLE 6 | | Fe | 1 at % | EXIST | 1.14 | 1.17 |
| EXAMPLE 7 | | Cr | 1 at % | EXIST | 1.12 | 1.26 |
| EXAMPLE 8 | | Zn | 1 at % | EXIST | 0.99 | 1.17 |
| EXAMPLE 9 | | In | 1 at % | EXIST | 0.93 | 1.17 |
| COMPARATIVE EXAMPLE 3 | | — | — | NONE | — | 1 |

Although the embodiments of the present invention have been described in detail, it is to be understood that the various change, substitutions, and alterations could be made hereto without departing from the spirit and scope of the invention.

The invention claimed is:

1. A ceramic electronic device comprising:
a multilayer chip in which each of a plurality of dielectric layers and each of a plurality of internal electrode layers including Ni as a main phase are alternately stacked,
wherein at least one of the plurality of dielectric layers includes Si, and
wherein one of the plurality of internal electrode layers next to the at least one of the plurality of dielectric layers includes a layer including an additive element including one or more of Au, Pt, Cu, Fe, Cr, Zn, and In,
wherein a peak of a concentration of the additive element and/or a peak of a concentration of Si in the one of the plurality of internal electrode layers and the at least one of the plurality of dielectric layers exist(s) in a region within 15 nm in a thickness direction from an interface between the one of the plurality of internal electrode layers and the at least one of the plurality of dielectric layers.

2. The ceramic electronic device as claimed in claim 1, wherein a total amount of the additive element is 0.01 at % or more and 5 at % or less with respect to Ni, in the one of the plurality of internal electrode layers.

3. The ceramic electronic device as claimed in claim 1, wherein the layer is a single metal of the additive element, an alloy including the additive element, or an oxide of the additive element.

4. The ceramic electronic device as claimed in claim 1, wherein each thickness of the plurality of dielectric layers is 0.5 μm or less.

5. The ceramic electronic device as claimed in claim 1, wherein the peak of the concentration of Si and the peak of the concentration of the additive element appear in the layer when STEM-EDS line analysis is performed in a stacking direction of the plurality of dielectric layers and the plurality of internal electrode layers.

6. The ceramic electronic device as claimed in claim 1, wherein a thickness of the one of the plurality of internal electrode layers is 0.05 μm or more and 0.4 μm or less.

7. The ceramic electronic device as claimed in claim 1, wherein the plurality of dielectric layers include barium titanate.

8. A manufacturing method of a ceramic electronic device comprising:
forming a plurality of stack units by forming each of internal electrode patterns of a Ni paste on each of dielectric green sheets including sintering agent including $SiO_2$, the Ni paste including an additive of one or more of Au, Pt, Cu, Fe, Cr, Zn and In;
forming a multilayer structure by stacking the plurality of stack units; and
firing the multilayer structure,
wherein a condition of the firing is adjusted in a manner that, in at least one of dielectric layers formed from the dielectric green sheets and one of internal electrode layers formed from the internal electrode patterns immediately next to the at least one of the dielectric layers, a peak of a concentration of the additive and/or a peak of a concentration of Si exist(s) in a region within 15 nm in a thickness direction from an interface between the one of the plurality of internal electrode layers and the at least one of the plurality of dielectric layers.

* * * * *